(No Model.)
F. H. LONG.
SOD CUTTING HARROW.
No. 484,440. Patented Oct. 18, 1892.
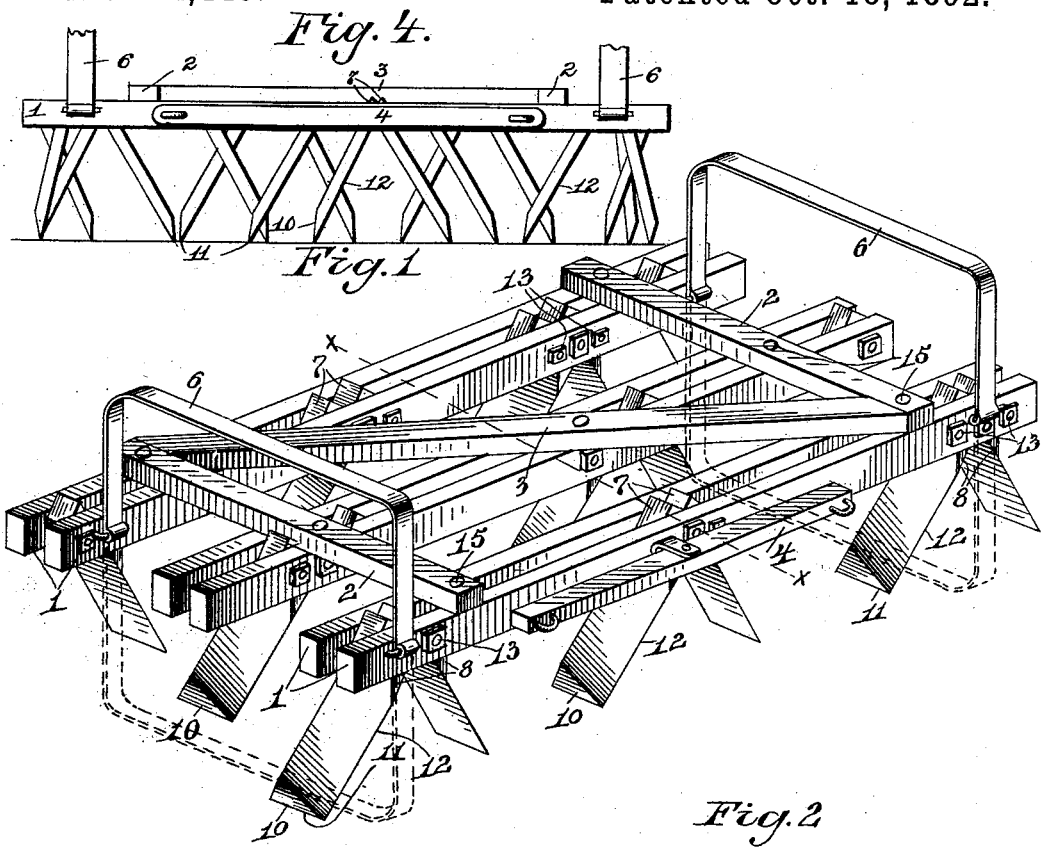
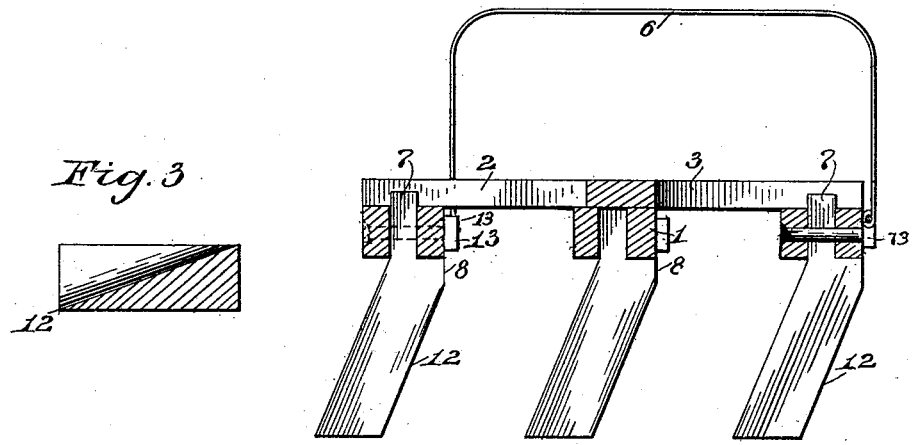
Witnesses:
E. M. Gallaher
W. S. Duvall
Inventor
Frank H. Long
By his Attorneys,
C. A. Snow & Co.

UNITED STATES PATENT OFFICE.

FRANK H. LONG, OF MANNING, IOWA.

SOD-CUTTING HARROW.

SPECIFICATION forming part of Letters Patent No. 484,440, dated October 18, 1892.

Application filed February 28, 1891. Renewed August 2, 1892. Serial No. 441,971. (No model.)

*To all whom it may concern:*

Be it known that I, FRANK H. LONG, a citizen of the United States, residing at Manning, in the county of Carroll and State of Iowa, have invented a new and useful Sod-Cutting Harrow, of which the following is a specification.

This invention relates to sod-cutting harrows; and the objects in view are to provide a cheap and simple harrow adapted for use in cutting sod and to thoroughly pulverize the same without turning the sod and mixing.

Other objects and advantages of the invention will appear in the following description, and the novel features thereof will be particularly pointed out in the claim.

Referring to the drawings, Figure 1 is a perspective of a sod-cutter constructed in accordance with my invention, showing one of the runners swung down in dotted lines. Fig. 2 is a transverse section on line *x x* of Fig. 1. Fig. 3 is a transverse section through one of the teeth. Fig. 4 is a front elevation thereof.

Like numerals of reference indicate like parts in all the figures of the drawings.

In practicing my invention I employ a series of pairs of harrow-bars 1, which series is connected by longitudinal bars 2 and a diagonal bar 3. This constitutes the framework, and the same is provided at one end with a draft-bar or doubletree 4 and at opposite sides with a pair of pivoted runners 6. The runners 6 may be swung down under the harrow, so as to serve as runners, and in this manner the harrow may be dragged from one field to another or to and from the point of use. When the harrow is in use, the runners are swung up over the frame thereof, serving as handles for elevating the harrow by hand over such obstructions as stumps, stones, or other objects likely to injure the teeth of the harrow. The teeth of the harrow each consist of an upper rectangular shank 7 and a laterally rearwardly-disposed blade, the latter having one plain face and an opposite beveled face 8, meeting the plain face at the front and forming an inclined cutting-edge. The lower end of the tooth is beveled, as at 10, and forms a cutting-edge 11, combining with the front cutting-edge 12 to form an obtuse angle. The teeth are arranged in pairs, have their plain faces toward each other in each pair, and are pivoted in position by bolts 3, passing through the harrow-bars and the shanks of the teeth. Binding-bolts 14 pass through the harrow-bars, connecting the same in pairs, and serve to clamp them upon the shanks of the teeth. The pairs of teeth of one harrow-bar alternate with those of the succeeding bar, so that a fine pulverization of the soil takes place. The connecting-bars are provided opposite the spaces between the harrow-bars with depending bolts 15, and nuts 16 are located on the lower end of the bolts under the bars, thus permitting of a clamping of the bars.

In use the front edges of the teeth, together with the lower edges, combine to cut the sod in narrow strips—in other words, pulverize the same. It will be observed that the pulverization does not in any way change the relation of the sod or its soil and that the sod is not turned or mixed, as is usually the case with harrows.

Having described my invention, what I claim is—

In a harrow, the combination, with a series of pairs of harrow-bars, of a series of teeth having their shanks shouldered and located between the bars, bolts passed through the shanks and bars, and separate binding-bolts passed through the bars between the shanks for the purpose of clamping the shanks between the bars, substantially as specified.

In testimony that I claim the foregoing as my own I have hereto affixed my signature in presence of two witnesses.

FRANK H. LONG.

Witnesses:
C. D. DEWING,
E. C. NORRIS.